US008792403B2

(12) United States Patent  (10) Patent No.: US 8,792,403 B2
Quick et al.  (45) Date of Patent: Jul. 29, 2014

(54) WIRELESS NETWORK COMMUNICATIONS SYSTEM

(75) Inventors: Ashleigh Glen Quick, Bowden (AU);
Marie Quick, Bowden (AU); Donald Murray Terrace, Bowden (AU)

(73) Assignee: Clipsal Australia Pty Ltd, Bowden (AU)

( * ) Notice: Subject to any disclaimer, the term of this patent is extended or adjusted under 35 U.S.C. 154(b) by 790 days.

(21) Appl. No.: 12/526,332

(22) PCT Filed: Feb. 6, 2008

(86) PCT No.: PCT/AU2008/000151
§ 371 (c)(1),
(2), (4) Date: Jan. 29, 2010

(87) PCT Pub. No.: WO2008/095250
PCT Pub. Date: Aug. 14, 2008

(65) Prior Publication Data
US 2010/0226266 A1    Sep. 9, 2010

(30) Foreign Application Priority Data
Feb. 9, 2007  (AU) ................................ 2007900637

(51) Int. Cl.
*H04H 20/71*  (2008.01)
(52) U.S. Cl.
USPC ....................................................... 370/312
(58) Field of Classification Search
USPC ........................................ 370/252, 312, 315
See application file for complete search history.

(56) References Cited

U.S. PATENT DOCUMENTS

| 4,056,779 | A | | 11/1977 | Toler |
| 5,481,535 | A | * | 1/1996 | Hershey ........................ 370/312 |
| 5,524,112 | A | * | 6/1996 | Azuma et al. ................. 370/402 |
| 5,553,083 | A | | 9/1996 | Miller |
| 5,727,002 | A | | 3/1998 | Miller et al. |
| 5,872,777 | A | * | 2/1999 | Brailean et al. ............... 370/349 |
| 5,920,701 | A | | 7/1999 | Miller et al. |
| 5,974,445 | A | | 10/1999 | Pivnichny et al. |
| 5,999,807 | A | * | 12/1999 | Kaplan et al. ................. 455/411 |
| 6,023,563 | A | * | 2/2000 | Shani ............................ 709/249 |
| 6,151,696 | A | | 11/2000 | Miller et al. |
| 6,201,811 | B1 | | 3/2001 | Larsson et al. |
| 6,453,438 | B1 | | 9/2002 | Miller et al. |
| 6,563,813 | B1 | | 5/2003 | Coveley |
| 6,625,652 | B1 | | 9/2003 | Miller et al. |
| 6,873,627 | B1 | | 3/2005 | Miller et al. |
| 7,002,509 | B2 | * | 2/2006 | Karlsson ........................ 342/90 |
| 7,006,461 | B2 | | 2/2006 | Kilfoyle et al. |

(Continued)

FOREIGN PATENT DOCUMENTS

| EP | 1021024 | 7/2000 |
| WO | 2005/015751 | 2/2005 |

(Continued)

*Primary Examiner* — Mohammad Anwar
(74) *Attorney, Agent, or Firm* — Greenblum & Bernstein, P.L.C.

(57) ABSTRACT

Disclosed are a method, system and protocol for processing a Transmission within a wireless network, the network including at least one device that transmits the Transmission and at least one device that receives the Transmission. The method provides for receiving the Transmission at the device that receives the Transmission; determining whether the device that receives the Transmission has previously received the Transmission; and actioning the received Transmission only if the device that receives the transmission has not previously received the Transmission.

41 Claims, 10 Drawing Sheets

(56) References Cited

U.S. PATENT DOCUMENTS

Figure 1:
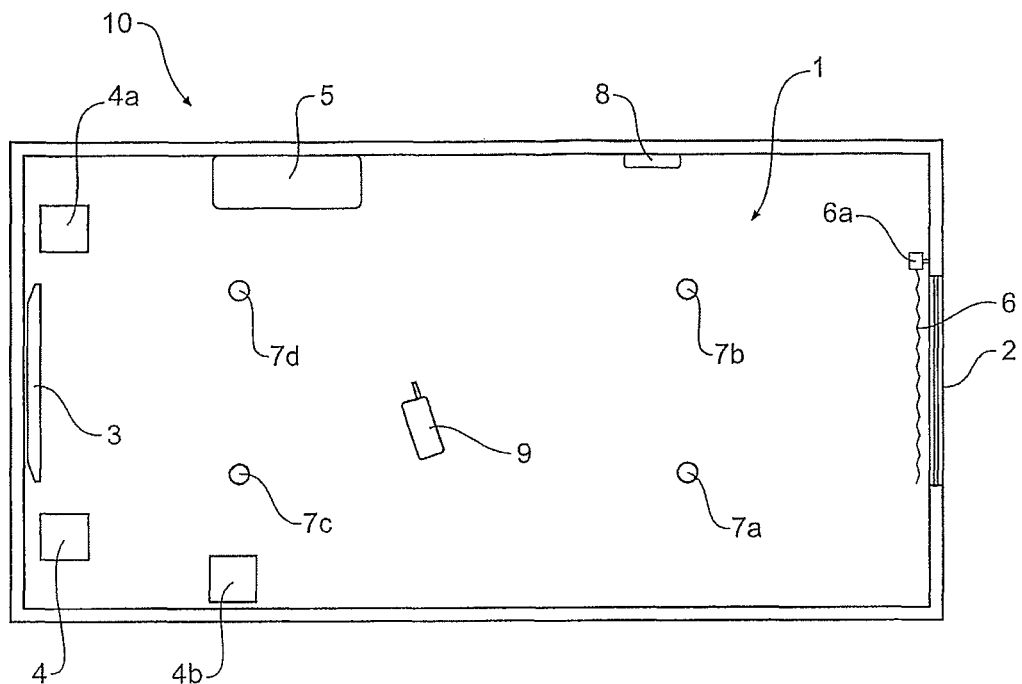

| | | |
|---|---|---|
| 7,016,332 B2 | 3/2006 | Kilfoyle |
| 7,061,891 B1 | 6/2006 | Kilfoyle et al. |
| 7,215,246 B1 | 5/2007 | Beard et al. |
| 7,529,241 B2 | 5/2009 | Milligan et al. |
| 7,542,438 B2 * | 6/2009 | Jang et al. .................... 370/312 |
| 2002/0093926 A1 | 7/2002 | Kilfoyle |
| 2003/0214919 A1 | 11/2003 | Kilfoyle et al. |
| 2005/0100016 A1 * | 5/2005 | Miller et al. .................. 370/390 |
| 2006/0077920 A1 | 4/2006 | Kilfoyle et al. |
| 2006/0077927 A1 | 4/2006 | Kilfoyle et al. |
| 2006/0083196 A1 | 4/2006 | Kilfoyle et al. |
| 2006/0192697 A1 | 8/2006 | Quick et al. |
| 2006/0203757 A1 | 9/2006 | Young et al. |
| 2006/0256746 A1 | 11/2006 | Quick et al. |
| 2006/0256798 A1 | 11/2006 | Quick et al. |
| 2007/0140213 A1 * | 6/2007 | Milligan et al. .............. 370/351 |

FOREIGN PATENT DOCUMENTS

| | | |
|---|---|---|
| WO | 2005/015774 | 2/2005 |
| WO | 2005/015811 | 2/2005 |
| WO | 2007/072577 | 6/2007 |
| WO | 2008/095249 | 8/2008 |
| WO | 2008/095250 | 8/2008 |

\* cited by examiner

WIRELESS NETWORK COMMUNICATIONS SYSTEM

TECHNICAL FIELD

The present invention relates to a network of devices which communicate with each other via radio frequency.

INCORPORATION BY REFERENCE

The following publications are referred to in the present application:
PCT Patent Application No. PCT/AU2004/001052 (WO2005/015774) entitled "Radio Network Communication System and Protocol Using An Automatic Repeater"
PCT Patent Application No. PCT/AU2004/001053 (WO2005/015811) entitled "Radio Network Communication System and Protocol"
PCT Patent Application No. PCT/AU2004/001054 (WO2005/015751) entitled "Collision Detection in a Non-Dominant Bit Radio Network Communication System"; and
Australian Provisional Patent Application No. 2007900639 entitled "Selective Communications Network Functionality"
Australian Provisional Patent Application No. 2007900637 entitled "Wireless Network Communications System"
the entire contents of each of which are hereby incorporated by reference.

BACKGROUND

Short range wireless communication networks are becoming more widely used and in more and more applications, including commercial and domestic applications. Such networks can consist of from two to many nodes, between which wireless communications occur. In one particular application, such nodes or devices can be used as part of a building infrastructure for control purposes. This is commonly referred to as Home or Building Automation.

Two factors relevant to such networks are:
1. Reliability—Obtaining reliable radio communication between the nodes presents a considerable challenge, because when radio is used in buildings it suffers from interference and attenuation. There are many sources of interference and attenuation, including the type of building materials used, other wireless devices, and the objects placed inside the building.
2. Scalability—Most networks have an upper limit on the number of nodes that can exist in a network. This limit can in some cases be difficult to determine, and can have many causes, including exceeding radio range (the distance between nodes becoming too great), or more frequently, consuming all of the available radio bandwidth. This latter case is also known as congestion.

There are many wireless communication systems presently deployed, which aim to solve these problems. Most available systems solve one problem only, at the expense of making the other problem worse.

Some systems use explicit routing of messages between nodes. In such systems, each node needs to know the path to every possible destination, through a series of intermediate nodes. This improves reliability, but has some consequent disadvantages:

a. Messages may be repeated by many intermediate nodes, leading to a long "on-air" time for a given piece of information as it is in transit from its source to its destination.
b. Each node needs to know the path to every possible destination, which means that each node needs to have the memory to store that path.
c. Such a system does not scale very well, because when one transmitting device wishes to communicate with several receiving devices, it must have routing for each of those destinations. Due to the physical limits on memory, the size of these tables is limited.
d. Scalability is also limited by wireless congestion due to the need to repeat multiple messages over a large number of devices or nodes, this being dependent on the size of the network.

An alternative approach to that described above is to dynamically discover a route from each source node to each destination node. In this case, a separate phase of software execution is needed to run the routing discovery process. This is because routing discovery should not take place when a message is to be transmitted—it would add to message delivery latency. The separate routing discovery phase needs to be coordinated to allow each node to interrogate the other nodes in the network, and find a path to each destination. However, this approach suffers from the same problems described above and involves very complex processing to perform the dynamic discovery.

Other systems use a technique known as "mesh" networking. In this technique, each device that receives a message retransmits it, so that the message propagates to all edges of the network. Mesh networking provides better reliability because messages can be repeated many times. However, this technique still has a number of drawbacks, including:

a. Because messages are repeated by many nodes, adding more nodes to a network can quickly cause congestion
b. This approach also makes poor use of bandwidth by having messages repeated many times. A consequence is either increased latency, or the need for higher bandwidth than would otherwise be needed; and
c. Some mesh networking systems require a specific node to be designated as a central controller to coordinate the operation of the network.

It is an object of the present invention to provide a method and system which addresses at least one of the disadvantages of the prior art.

SUMMARY OF THE INVENTION

According to a first aspect of the present invention, there is provided a method of processing a Transmission within a wireless network, the network including at least one device that transmits the Transmission and at least one device that at least receives the Transmission, the method comprising:
receiving the Transmission at the device that at least receives the Transmission;
determining whether the device that at least receives the Transmission has previously received the Transmission; and
actioning the received Transmission only if the device that at least receives the transmission has not previously received the Transmission.

In one form, the device that at least receives the Transmission is a Receiver, and the step of actioning the Transmission is accepting the Transmission.

In another form, the device that at least receives the Transmission is a Repeater, and the step of actioning the Transmission is repeating the Transmission.

In one form, the step of determining whether the device that at least receives the Transmission has previously received the Transmission comprises determining a Transmission Signature for the Transmission and comparing this with one or more stored Transmission Signatures of previous Transmissions, stored in a memory of the device that at least receives the Transmission.

In one form, the Transmission Signature is derived from the product of an Originating Transmitter Identifier and a Transmission Identifier.

In one form the Transmission Identifier is provided to the Transmission by a Transmitter generating and transmitting the Transmission.

In one form, the Transmission Identifier is m bits in length.

In one form, the memory for storing the Transmission Signatures has up to N−1 entries for storing the Transmission Signatures, where $N=2^m$.

In one form, the method further comprises comparing the hop count of the Transmission with a hop count threshold and not actioning the Transmission if the hop count is greater than the hop count threshold.

In one form, the wireless network is a multicast wireless network.

According to a second aspect of the present invention, there is provided a device for use in a wireless multicast communications network, the device comprising:
  a receiver for receiving a Transmission; and
  means for determining whether the Transmission has been previously received; and
  means for actioning the Transmission only if the Transmission has not been previously received.

In one form, the device is a Repeater.

In another form, the device is a Receiver.

In one form the means for determining whether the Transmission has been previously received comprises means for comparing a Transmission Signature of the Transmission with stored Transmission Signatures of previously-received Transmissions.

In one form the device further comprises a memory for storing one or more Transmission Signatures.

In one form, the wireless network is a multicast wireless network.

According to a third aspect of the present invention, there is provided a wireless communications protocol for a data transmission, the protocol having a frame structure comprising:
  at least one data field for data to be transmitted; and
  at least one Transmission Identifier field for a Transmission Identifier associated with the Transmission.

In one form the frame structure further comprises at least one hop count field for a hop count associated with the Transmission;

In one form, the hop count is cleared by an originating transmitter.

In one form the Transmission Identifier is an identifier set by the originating transmitter.

In one form the Transmission Identifier is unique to the transmission for that Transmitter.

In one form the Transmission Identifier is limited to in bits in length.

In one form, the Transmission Identifier is incremented with each transmission, up to a maximum of $2^m-1$, after which a further increment sets the Transmission Identifier to 0.

DRAWINGS

Figure 2:
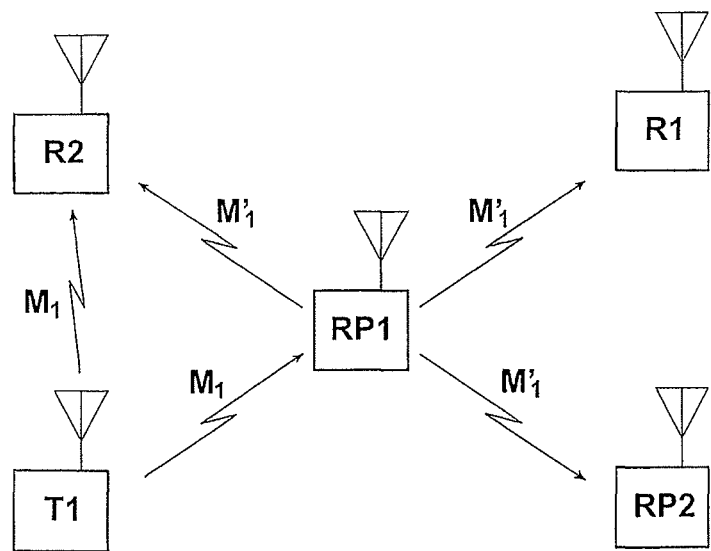
Figure 3:
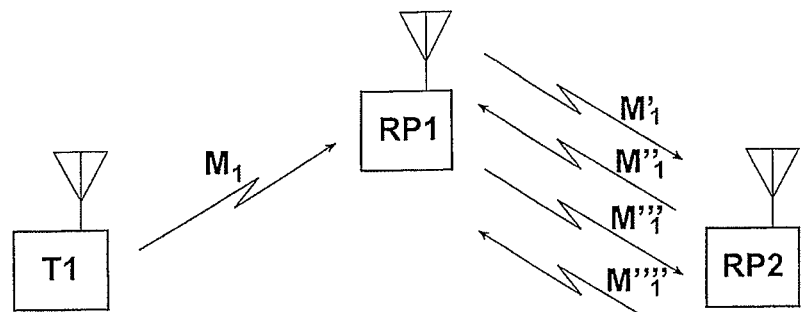
Figure 4:
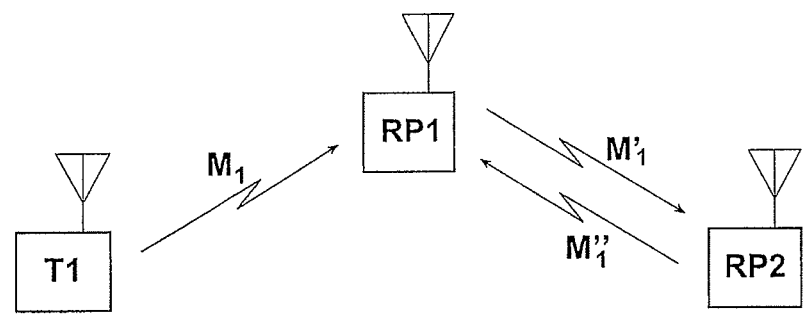
Figure 5:
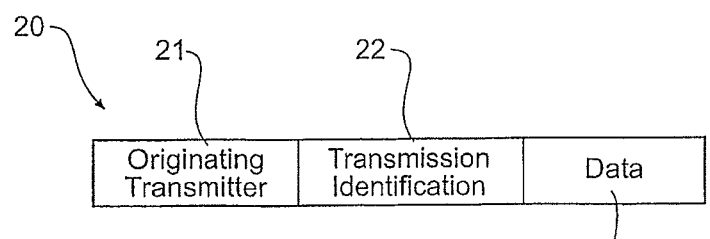
Figure 6:
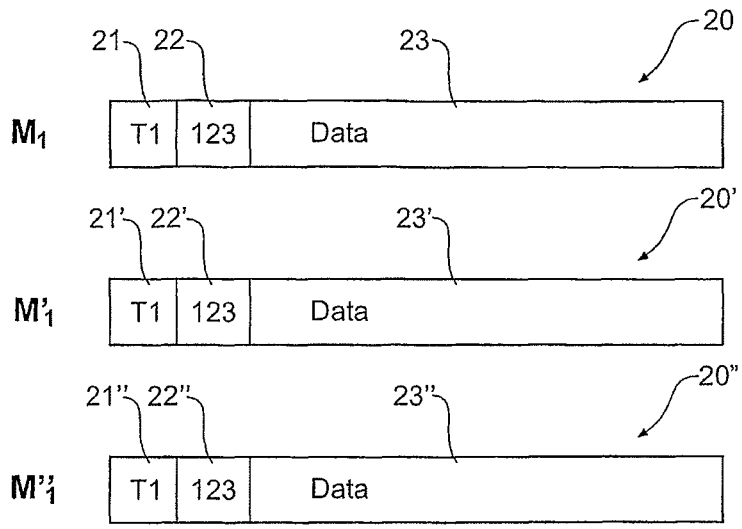
Figure 7:
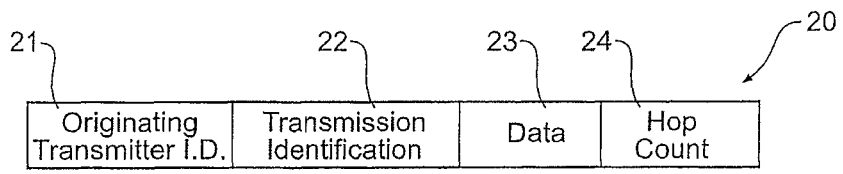
Figure 8:
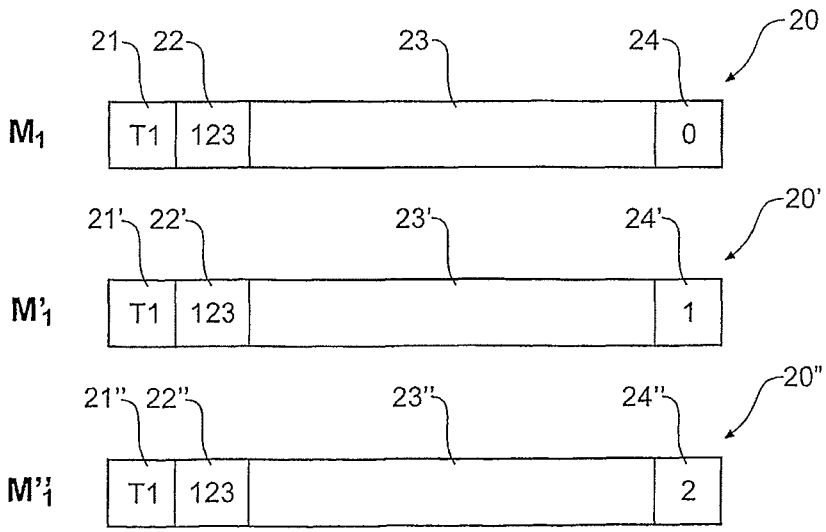
Figure 9:
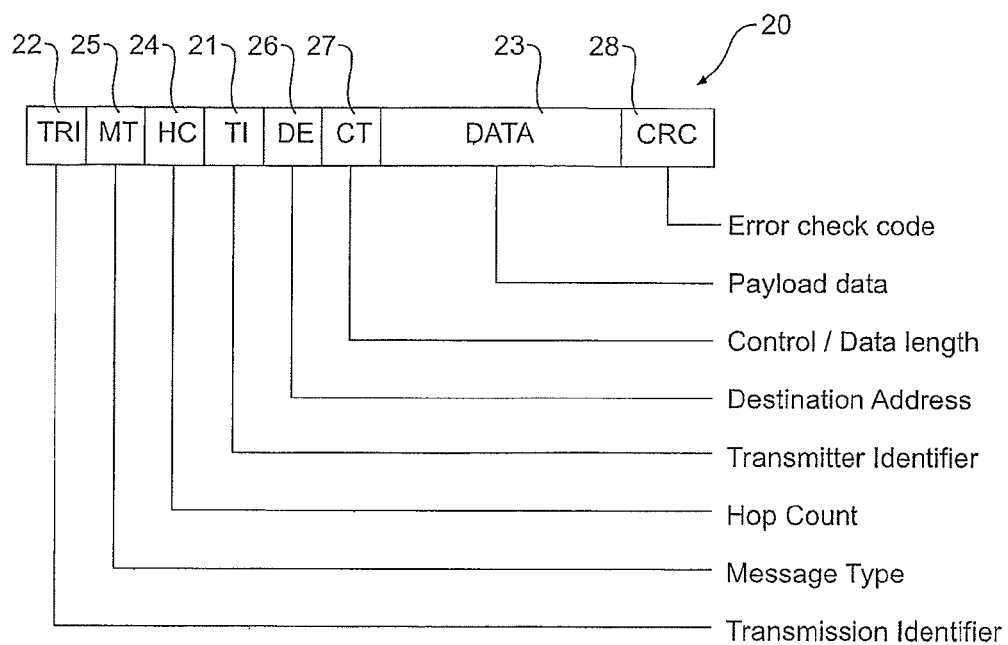
Figure 10:
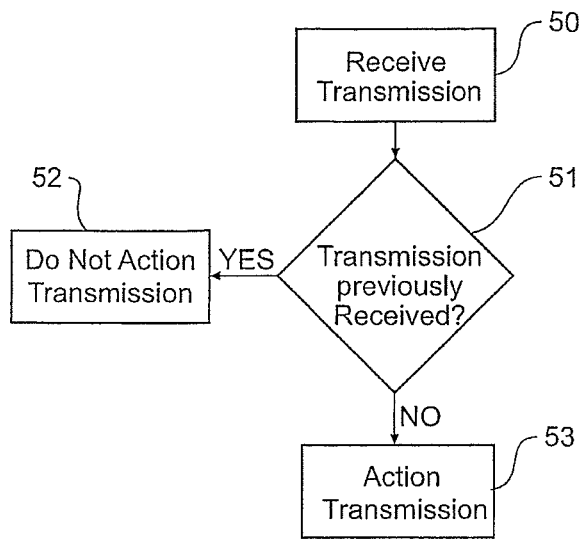
Figures 11A, 11B:
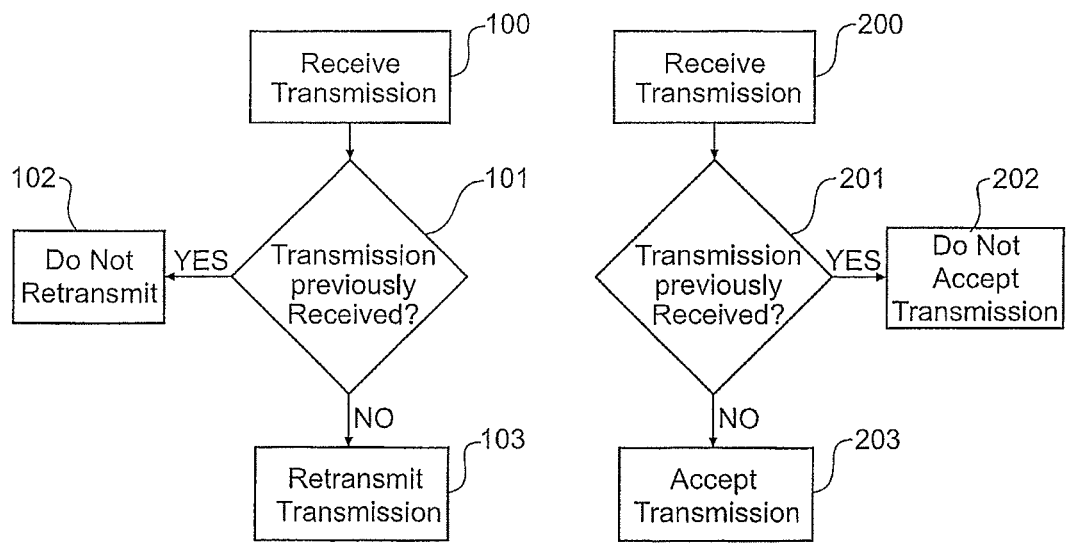
Figure 12:
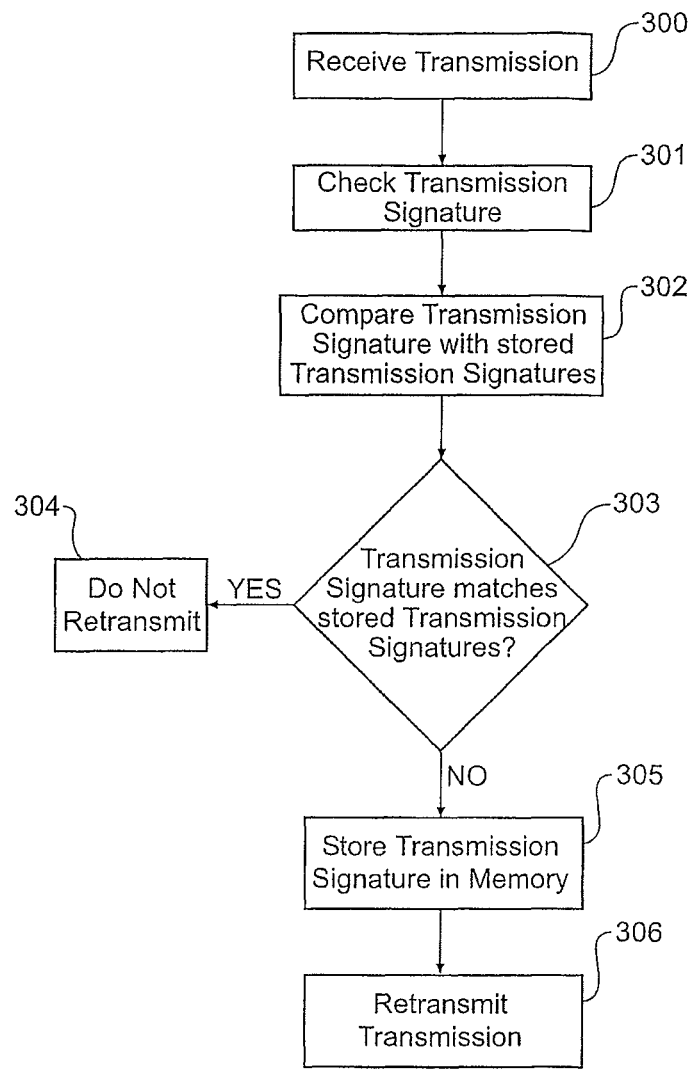
Figure 13:
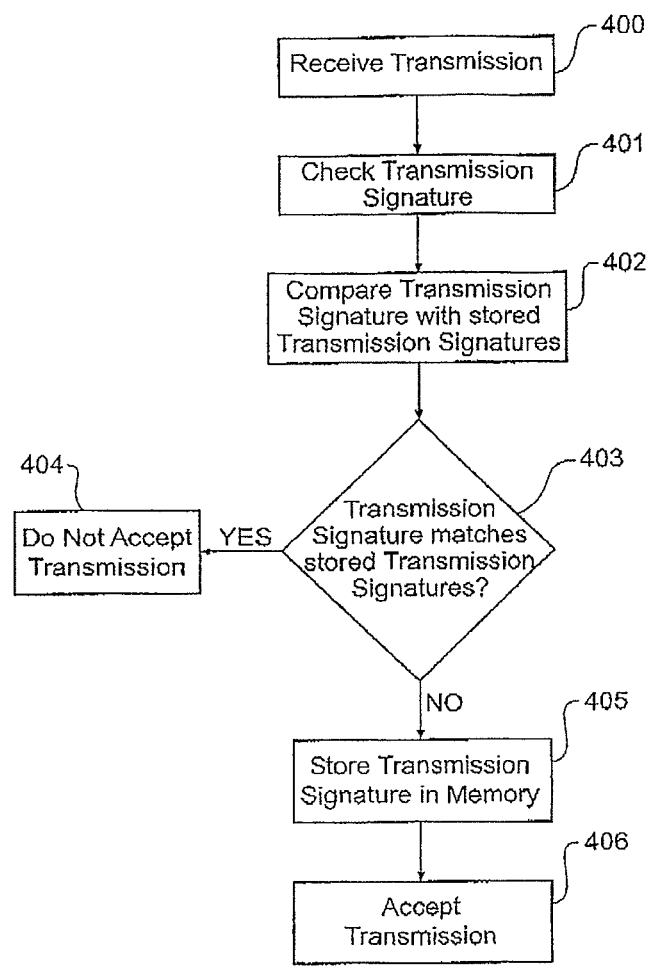
Figure 14:
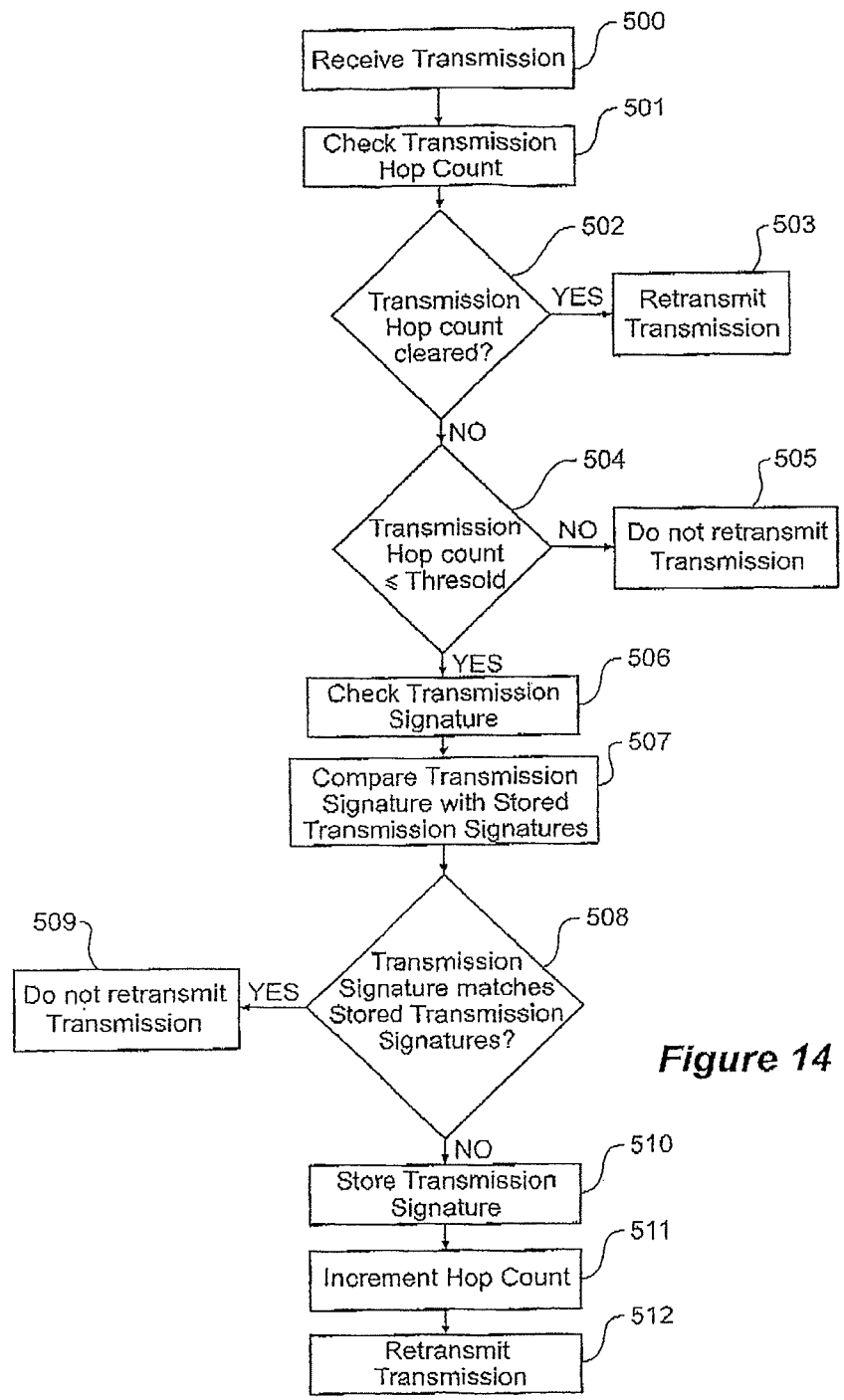
Figure 15:
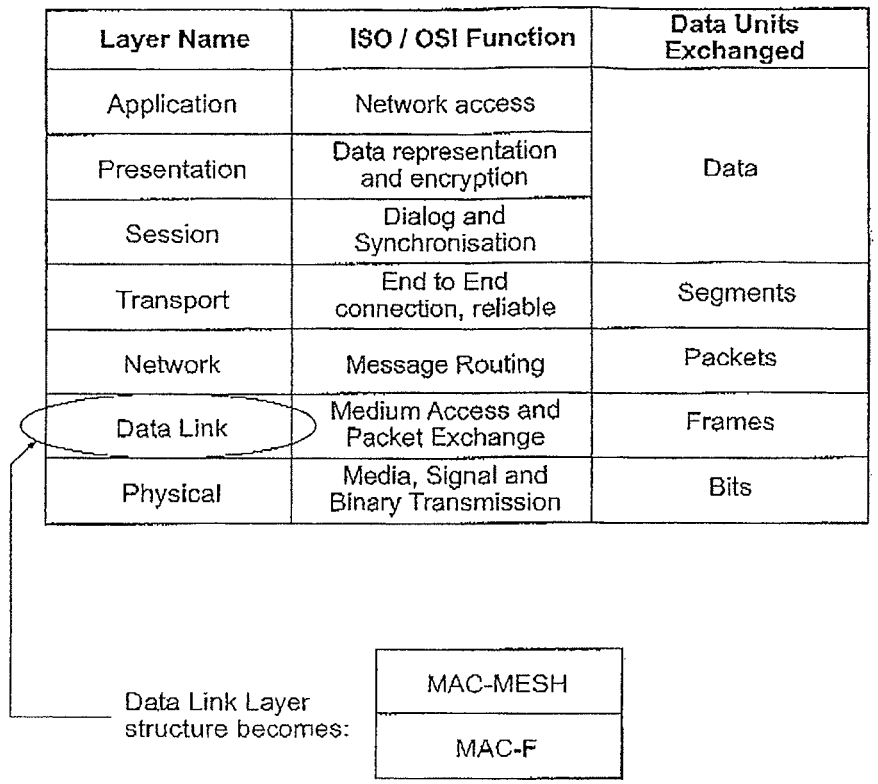
Figure 16:
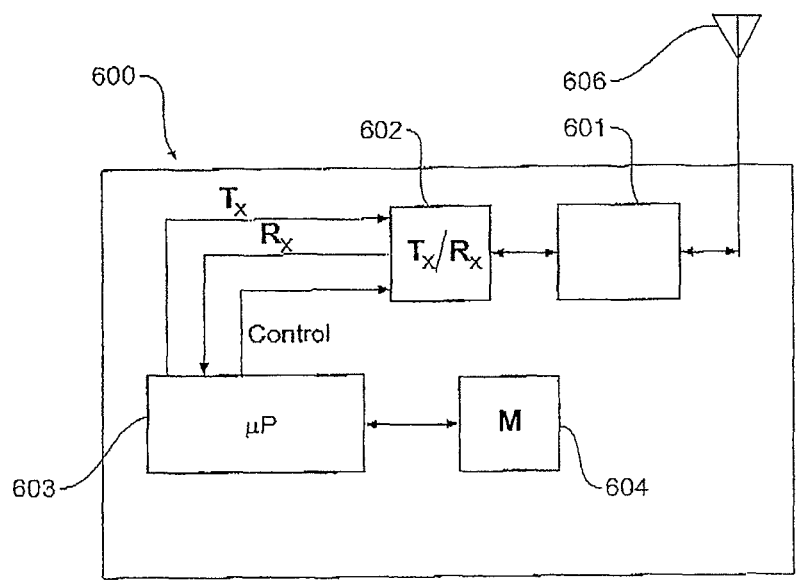

The invention will now be described with reference to the following drawings in which:

FIG. 1—shows one possible application of one aspect of the present invention in a room;

FIG. 2—shows a representation of a network with five devices that use wireless communication, with one transmitter, two receivers and two repeaters;

FIG. 3—shows a subset of the network of FIG. 2, showing the Transmitter and the two Repeaters repeating the same transmission;

FIG. 4—shows the arrangement of FIG. 3 with an original transmission and two repeat transmissions between the two Repeaters;

FIG. 5—shows a transmission frame structure according to one aspect of the invention;

FIG. 6—shows the frame structures of the original transmission and the two repeat transmissions of FIG. 4;

FIG. 7—shows a transmission frame structure including a hop count field;

FIG. 8—shows the frame structures of FIG. 5 with the hop count field of FIG. 7;

FIG. 9—shows the exemplary frame structure of the frame structure of FIG. 7 with actual data;

FIG. 10—shows a method of actioning a transmission according to one aspect of the present invention;

FIG. 11A—shows the method of actioning a transmission according to one aspect of the present invention, at a Repeater;

FIG. 11B—shows the method of actioning a transmission according to one aspect of the present invention, at a Receiver;

FIG. 12—shows a method of processing a transmission according to another aspect of the present invention, at a Repeater;

FIG. 13—shows a method of processing a transmission according to another aspect of the present invention, at a Receiver;

FIG. 14—shows a method of processing a transmission according to another aspect of the present invention, using a hop count, at a Receiver;

FIG. 15—shows an ISO model communication protocol stack and the point at which a new communication sub-layer can be inserted; and FIG. 16—shows a structure of a device for use in the present invention.

DETAILED DESCRIPTION

Various aspects of the present invention will now be discussed in more detail, in the context of a building control or home automation system. It will be understood however, the various aspects of the present invention are equally applicable to other network applications, including but not limited to, extending the range of wireless headsets and wireless computer peripherals (such as keyboard, mouse, printer and scanner).

FIG. 1 shows an exemplary application of an aspect of the present invention as applied to a domestic home automation system. Of course, the example could equally illustrate a commercial office set up or other application.

In FIG. 1, there is shown a network 10 of devices arranged in a room 1 having a window 2, the devices performing various functions. In particular, there is shown in this example, a television 3, audio system 4 with associated speakers 4a and 4b, air conditioning system 5, curtain control system 6 with associated curtain 6a, lights 7a, 7b, 7c and 7d, wall controller 8 and remote controller 9.

Each of devices 3 to 7 are devices that may be controlled by controller devices 8 and 9. In one aspect, remote controller 9 may also control wall controller 8 to then control each of devices 3 to 7, as well as optionally directly controlling each of devices 3 to 7. For example, curtain 6 could be drawn and opened via the user operating wall controller 8 directly, or by the person using remote controller 9 directly, or by controlling wall controller 8 via remote controller 9.

Similarly, lights 7a to 7d could be turned on or off or otherwise dimmed at wall controller 8, or the user could control the room illumination directly via remote controller 9, or by controlling wall controller 8 via remote controller 9.

It will be understood that these devices and this arrangement is exemplary only, and any other set up could be used, including multiple rooms, multiple buildings and any other controllable device such as coffee machines, security alarm or monitoring systems, hot water appliances and ovens, as well as office equipment including printers, facsimile machines and telephone conference devices.

It will also be understood that the various aspects of the present invention may be used with a wide range of communications protocols such as those described in PCT Patent Application No. PCT/AU2004/001052 (WO2005/015774) entitled "Radio Network Communication System and Protocol Using An Automatic Repeater"; PCT Patent Application No. PCT/AU2004/001053 (WO2005/015811) entitled "Radio Network Communication System and Protocol" and PCT Patent Application No. PCT/AU2004/001054 (WO2005/015751) entitled "Collision Detection in a Non-Dominant Bit Radio Network Communication System" the entire contents of each of which are hereby incorporated by reference.

The various aspects of the present invention may also be applied in combination with any one or more the various aspects of the inventions as described in co-pending Australian Provisional Patent Application entitled "Selective Communications Network Functionality", the entire contents of which are hereby incorporated by reference.

While the various aspects of the present invention will be described in the context of a multicast or "point-to-multipoint" wireless communications system in which a transmission is transmitted to a plurality of receivers at once, the various aspects of the present invention may also be applied to a "point-to-point" communications system, in which transmissions are sent directly from one device to another.

It will also be understood that the repeating function takes into account the fact that a device could send the same message down through its communication protocol stack (from its application layer) several times. Each copy requiring transmission by the top layer of a protocol stack has to appear in the destination node(s), irrespective of what goes on in the underlying network. This means that although several messages may appear the same to the application layers of the protocol stack, they are considered separate and distinct by the repeating functions in the lower layers of a communication protocol stack.

FIG. 2 shows an exemplary network of devices including a Transmitter T1, a first Repeater RP1, a second Repeater RP2, and first Receiver R1 and a second Receiver R2. It will be understood that any of the devices may also perform any of the functions (i.e. all devices may be capable of transmitting, or receiving, or acting as a repeater), but in this example, they perform at least the function indicated.

As can be seen in FIG. 2, Transmitter T1 transmits a first transmission M1, which is received by Receiver R2 as well as Repeater RP1. Receiver R1 and Repeater RP2 are out of range in this example and can only receive transmission M1 via Repeater RP1.

Upon receiving transmission M1, RP1 repeats the transmission and retransmits this as M1', to be received by Receiver R1 and Repeater RP2, and, incidentally, R2 and T1.

FIG. 3 shows a variation and subset of the network of FIG. 2, showing Transmitter T1, a first Repeater RP1 and a second Repeater RP2. Transmitter T1 generates and transmits transmission M1, which is then received by first Repeater RP1, which then retransmits transmission M1 as M1' which is received by second Repeater RP2. RP2 will then retransmit transmission M1' as M1", which is then received by first Repeater RP1. In arrangements not employing one or more aspects of the present invention, first Repeater RP1 will then retransmit M1" as M1'" which will then be received again by second repeater RP2 and again retransmitted as M1"", a fourth copy of the original transmission M1. It will be appreciated that this will continue until some limit on hops or retransmissions is imposed.

FIG. 4 shows the arrangement of FIG. 3, with one or more aspects of the present invention applied. In this example, Transmitter T1 will transmit transmission M1 which will be received by first Repeater RP1 which then retransmits transmission M1 as M1' which is received by second Repeater RP2. RP2 will then retransmit transmission M1' as M1", which is incidentally received by first Repeater RP1, as in the example in FIG. 3. However, in accordance with an aspect of the present invention, the device, being in this example first Repeater RP1, will only repeat or retransmit one copy of a given transmission. Because first Repeater RP1 has already retransmitted M1 as M1', it will not now retransmit received transmission M1". Accordingly, second Repeater RP2 will not receive a further copy M1'" as in the example in FIG. 3, and thus the cycle will have been broken. This leads to reduced instances of congestion in the network. In one form of this aspect of the invention, first Repeater RP1 knows that it has already received and retransmitted M1 because of a special marker providing a unique transmission signature. The transmission signature may be incorporated directly in the transmission, or may be derived from a Transmission Identifier for that transmission in the data frame of M1, as will be described in more detail below. In one example, the transmission protocol according to another aspect of the present invention provides a data frame 20 having a field 21 for Originating Transmitter Identification information, to identify the Transmitter that originally transmitted the transmission, a field 22 for a Transmission Identifier to identify the particular transmission, and a field 23 for the actual data to be transmitted. This frame structure is shown in FIG. 5. Of course, any other fields could be added according to the particular application such as Header and Error Check fields, and the order of these fields could be changed as desired, as would be understood by the person skilled in the art.

It will be appreciated that the arrangements shown in FIGS. 3 and 4 may also represent a point-to-point wireless communication system as well as a multicast wireless communications system.

FIG. 6 shows the frame structures with exemplary data of the original transmission M1, the repeated transmission M1' transmitted by first Repeater RP1 and the further repeated transmission M1" transmitted by second Repeater RP2 in FIG. 4.

It can be seen that M1 has frame 20 with field 21 for the Originating Transmitter Identification which in this example is identification information for Transmitter T1 in FIG. 4, field 22 for the Transmission Identifier to identify the particular transmission, which in this example is '123', and a field 23 for the actual data to be transmitted.

Once transmission M1 has been received by first Repeater RP1, RP1 will check the transmission signature as described above to determine whether that particular transmission has been received by the first Repeater RP1 previously. The transmission signature may take on any form, to allow the transmission to be uniquely identified. In a network in which each device has a unique identifier such as a network address, the transmission signature may be derived from a combination of the Transmitter Identification in field 21 and the Transmission Identifier in field 22. This will provide a unique signature for each transmission. In this case, one or more different transmissions from different originating devices (e.g. transmitter) may have the same Transmission Identifier, provided that each originating device (e.g. Transmitter) does not use the same Transmission Identifier for any of its transmissions. To provide for uniqueness, each transmitting device increments its own Transmission Identifier each time it transmits a new message. There need be no relationship between the Transmission Identifiers in different transmitting devices.

In a network in which devices can not be uniquely identified, the actual Transmission Identifier in field 22 may be unique across all transmissions, and the actual Originating Transmitter Identification in field 21 need not be used in this application. Indeed, field 21 need not be present at all in a transmission frame in this example. Of course any other means of uniquely identifying transmissions may be used.

Once the first Repeater RP1 has determined the transmission signature for transmission M1, it will compare this with transmission signatures stored in its memory from previously-received transmissions. If the comparison results in a match, first Repeater RP1 will determine that transmission M1 has previously been received by it and it will not retransmit transmission M1'. If no match is found, first Repeater RP1 will store the transmission signature for M1 in its memory and retransmit M1 as M1' as seen in FIG. 4. FIG. 6 shows the frame for retransmitted transmission M1'.

Upon receipt of transmission M1', second Repeater RP2 will compare this with transmission signatures stored in its memory from previously-received transmissions. If the comparison results in a match, second Repeater RP2 will determine that transmission M1' has previously been received by it and it will not retransmit transmission M1". If no match is found, second Repeater RP2 will store the transmission signature for M1' in its memory and retransmit M1' as M1" as seen in FIG. 4. FIG. 6 shows the frame for retransmitted transmission M1".

Upon now receiving transmission M1", first Repeater RP1 will again check the transmission signature. The Originating Transmitter Identification in field 21" (if used) is the same as in transmission M1, and the Transmission Identifier in field 22" is also the same as in transmission M1, yielding an identical transmission signature to that stored in first Repeater RP1's memory. The resulting match will indicate to first Repeater RP1 that this transmission has already been received and retransmitted by it and so it will not retransmit it again. This will break the continuous retransmission cycle described in relation to FIG. 3 above.

While the frame structures shown in FIG. 6 includes field 21 for the Originating Transmitter Identification, it will be appreciated however that this field need not exist if other ways of uniquely identifying each transmission are used.

In a further, optional form of the present invention, if the device receiving the transmission is a Receiver, the same actions as described above may be taken, however, instead of not retransmitting the transmission, the Receiver will not accept the transmission.

In a further, optional form of the present invention to provide a further refinement to the operation of a wireless network, there can be placed a limit to the number of times that a given message can pass through repeaters.

Placing a limit on the number of times a message can be copied (number of hops) assists in preventing expansion of a network to a point that would degrade performance by excessive latency, and helps to place an upper bound on the amount of network bandwidth that can be used by re-transmissions. In one form, this is achieved by adding a hop count field to the transmission frame. FIG. 7 shows a transmission frame 20 with fields 21, 22, 23 and 24. The first three fields are the same as those previously described in relation to FIG. 5, and are labelled accordingly. Specifically, field 21 for Originating Transmitter Identification information, to identify the Transmitter that originally transmitted the transmission, field 22 for a Transmission Identifier to identify the particular transmission, and field 23 for the actual data to be transmitted. In this aspect, additional field 24 is added to accommodate the hop count.

This hop count field is cleared by any device issuing a new message or transmission for the first time (be it a Transmitter or a Repeater), and it is incremented by each Repeater that the transmission passes through. In one form, Repeaters refuse to copy a message that has a hop count above a given threshold.

FIG. 8 shows the same transmission frame structures as FIG. 6, except that in FIG. 8, the additional hop count field 24 is included in each transmission frame. M1 has frame 20 with field 21 for the Originating Transmitter Identification which in this example is identification information for Transmitter T1 in FIG. 4, field 22 for the Transmission Identifier to identify the particular transmission, which in this example is '123', and a field 23 for the actual data to be transmitted. Field 24 has a hop count of 0, since M1 is the original transmission.

It will be appreciated that in these examples, a cleared hop count has a numeric value of 0. However, any suitable value could be used to indicate the cleared or "no hops" case, depending on circumstances.

Once transmission M1 has been received by first Repeater RP1, RP1 will check the transmission signature as described above to determine whether that particular transmission has been received by the first Repeater RP1 previously. In an alternative form, Repeater RP1 can first check the hop count in field 24. If this is cleared, then by definition, transmission M1 can not have been received by Repeater RP1 (or any other repeater) previously, and Repeater RP1 can act accordingly, such as retransmit transmission M1 as transmission M1'. The frame structure for M1' as shown in FIG. 8 shows that all fields are the same as for M1, except that the hop count in field 24 has been incremented from 0 to 1. When this optimisation is used, repeater RP1 will still store the transmission signature in its memory.

It will be appreciated that first Repeater RP1 may also or in alternative to, determine whether it has received the transmission M1 previously by reference to the transmission signature as previously described. The presence of a hop count field does not require its use in determining this, and does not preclude the use of the transmission signature.

Upon receipt of transmission M1', second Repeater RP2 will see that the hop count is not cleared, and therefore cannot assume that it has not received this transmission before. In this case, there is the option to compare the hop count to a preset hop count threshold. If the hop count is below the preset threshold, second Repeater RP2 may then continue to determine whether it has previously received transmission M1' as previously discussed above with reference to FIG. 6. If the hop count is equal to or above the threshold, second Repeater RP2 may elect not to retransmit transmission M1' regardless of whether or not it has received the transmission M1' previously.

If for example the hop count threshold has been set to 5, the current hop count of 1 is below the threshold and second Repeater RP2 will proceed with the check for previous receipt by comparing the transmission signature with transmission signatures stored in its memory from previously-received transmissions. If the comparison results in a match, first Repeater RP2 will determine that transmission M1' has previously been received by it and it will not retransmit transmission M1. If no match is found, first Repeater RP1 will store the transmission signature for M1' in its memory and retransmit M1' as M1" as seen in FIG. 4. FIG. 8 shows the frame for retransmitted transmission M1" in which it can be seen that the hop count in frame 24" has been incremented again, to 2.

Upon now receiving transmission M1", first Repeater RP1 will again check the hop count and compare this with the hop count threshold. In this example, the hop count for M1" is 2, below the hop count threshold of 5, and so it then proceeds to check the transmission signature. The Originating Transmitter Identification in field 21" (if used) is the same as in transmission M1, as is the Transmission Identifier in field 22" is also the same as in transmission M1, yielding an identical transmission signature to that stored in first Repeater RP1's memory. The resulting match will indicate to first Repeater RP1 that this transmission has already been received and retransmitted by it and so it will not retransmit it again. This will break the continuous retransmission cycle described in relation to FIG. 3 above.

If in the above example, the hop count was 5, then first Repeater RP1 may then not retransmit the transmission M1" regardless of whether or not it had been received by first Repeater RP1 previously.

Again, while the frame structure shown in FIG. 8 includes field 21 for the Originating Transmitter Identification, it will be appreciated that this field need not exist if other ways of uniquely identifying each transmission are used.

In a further, optional form of the present invention, if the device receiving the transmission is a Receiver, the same actions as described above may be taken, however, instead of not retransmitting the transmission, the Receiver will not accept the transmission.

FIG. 9 shows an actual example of a transmission frame for a transmission that may be used in a network applying various aspects of the present invention. In this example, frame 20 has field 22 for the Transmission identifier, as previously described, field 25 for a Message Type, field 24 for the hop count, field 21 for the Transmitter identifier, field 26 for a destination address, field 27 for control/data length, field 23 for the payload data and field 28 for CRC error check codes.

The above methods are now described in general terms with reference to FIGS. 10 to 14.

FIG. 10 shows a general method according to one aspect of the present invention, for use by a device such as a Repeater or a Receiver in a network of devices. At step 50, a Transmission (generated for example by a Transmitter) is received by the device. The device then determines whether the Transmission has been received by it previously, at step 51. If so, then the device will not action the Transmission (step 52). If at step 51, the device determines that the Transmission has not been received by it before, then it will proceed to step 53 and action the Transmission.

The form of action to be taken will be determined by the type of device. For example if the device is a Repeater, then the action will be to repeat, or retransmit, the Transmission. If the device is a Receiver, the action will be to accept the Transmission. It will be understood that just because a device is labelled as a Repeater or a Receiver or indeed as a Transmitter, this does not mean that the device is capable only of that function, but just that it performs that function for a given action. It may be that all devices are capable of transmission, repeating and receiving, but have been allocated one or more of these functions, either temporarily or permanently, within a given network as required.

FIG. 11A shows the general method according to that described in FIG. 10 above, as used by a Repeater in a network of devices. At step 100, a Transmission (generated for example by a Transmitter) is received by the Repeater. The Repeater then determines whether the Transmission has been received by it previously, at step 101. If so, then the Repeater will not retransmit the Transmission (step 102). If at step 101, the Repeater determines that the Transmission has not been received by it before, then it will proceed to step 103 and retransmit the Transmission.

FIG. 11B shows the same procedure as would be undertaken by a device that is acting as a Receiver and not as a Repeater. In this example, at step 200, a Transmission (generated for example by a Transmitter) is received by the Receiver. The Receiver then determines whether the Transmission has been received by it previously, at step 201. If so, then the Receiver will not accept the Transmission (step 202). If at step 201, the Receiver determines that the Transmission has not been received by it before, then it will proceed to step 203 and accept the Transmission.

It will be understood that in a given network each of these methods may be employed separately, or in combination. That is, in a given network, one or more Repeaters in the network may employ the method as set out in FIGS. 10 and 11A, and one or more or all Receivers may employ the method as set out in FIG. 11B.

It will also be understood that when a Receiver is described as accepting the transmission, this merely means that the transmission is to be considered for whatever other processing the receiver normally performs. This other processing may include taking some action in response to the transmission, but may also include discarding the transmission for any other reason appropriate to the end function performed by the receiver device.

Turning now to FIG. 12, there is shown one specific form of carrying out the general method of FIG. 10. In this form, the Repeater receives the Transmission at step 300 and then determines whether it has received this Transmission before. In this form, this is done by checking the Transmission Signature (described above in detail) at step 301, and comparing (step 302) this with any Transmission Signatures from previously-received Transmissions that it has stored in memory. If at step 303, it is determined that the Transmission Signature of the currently-received Transmission matches that of a previously-received Transmission, the method proceeds to step 304 in which the Repeater does not retransmit the Transmission. If, at step 303, it is determined that there is no match to the Transmission Signature, the method proceeds to step 305 in which the Repeater stores the Transmission Signature in memory and then retransmits the Transmission in step 306.

FIG. 13 shows one form of the general method as illustrated in FIG. 11B, for the actions taken by a Receiver. In this form, the Receiver receives the Transmission at step 400 and then determines whether it has received this Transmission before. In this form, this is done by checking the Transmission Signature (described above in detail) at step 401, and comparing (step 402) this with any Transmission Signatures from previously-received Transmissions that it has stored in memory. If at step 403, it is determined that the Transmission Signature of the currently-received Transmission matches that of a previously-received Transmission, the method proceeds to step 404 in which the Receiver does not accept the Transmission. If, at step 403, it is determined that there is no match to the Transmission Signature, the method proceeds to step 405 in which the Receiver stores the Transmission Signature in memory and accepts the Transmission in step 406.

It will be understood that some of these steps in FIGS. 12 and 13 may be performed in other orders. For example, with reference to FIG. 13, steps 405 and 406 may be reversed, i.e. the Transmission may be accepted and then the Transmission signature may be stored in memory.

FIG. 14 shows the method according to another form of the general method of FIG. 10. In this form, use is made of a hop count as previously described in detail above. At step 500, the Repeater receives the Transmission and checks the value of the hop count of the Transmission at step 501. If the hop count is determined to be cleared at step 502, the Receiver knows that it has not received the Transmission before, and proceeds at step 503 to retransmit the Transmission. If at step 502 it is determined that the hop count is not cleared, the method proceeds to step 504 to determine whether the hop count is less than a preset threshold. If it is determined that the hop count exceeds the threshold, the method proceeds to step 505 and the Transmission is not retransmitted. If the hop count is equal to or less than the threshold, the method proceeds to step 506 in which the Transmission signature is checked and then compared with stored Transmission Signatures in step 507. Of course it will be understood that the decision point could be selected such that the Transmission is not retransmitted if the hop count is equal to or exceeds the threshold, and the method proceeds to check the Transmission Signature if the hop count is less than the threshold. If at step 508, it is determined that the Transmission Signature of the currently-received Transmission matches that of a previously-received Transmission, the method proceeds to step 509 in which the Repeater does not retransmit the Transmission. If, at step 508, it is determined that there is no match to the Transmission Signature, the method proceeds to step 510 in which the Repeater stores the Transmission Signature in memory, increments the hop count of that Transmission by 1 in step 511 and then retransmits the Transmission in step 512. Again, the particular order of some of the steps may be changed, such as the steps at 510, 511 and 512.

The operation of a Receiver in accordance with the specific form of the method described with reference to FIG. 14 above will be identical except that instead of electing not to retransmit the Transmission, the Receiver will elect not to accept the Transmission, as outlined in the general method for a Receiver with reference to FIG. 11B.

Various devices within a network may employ one or more of the various methods as described above by programming their respective microprocessors using software described by the following pseudo-code:

Transmit by a Device that is not Operating as a Repeater:

```
Make new transmission identifier
    Set transmission identifier field of message to transmission
identifier
    Clear hop count field of message
    Transmit as normal.
```

(A Multicast Transmission System would Mean that all Devices in Range, Including Repeaters, will Receive the Message)
Reception by a Device that is not Operating as a Repeater:

```
IF message hop count is clear THEN
    Accept message and process it as normal
ELSE IF message signature is in my history THEN
    Discard message
ELSE
    Accept message and process it as normal
    Add message signature to my history
END IF
```

Transmit by a Device that is Operating as a Repeater—where the Message Originates in the Repeater Device

```
Make new transmission identifier
    Set transmission identifier field of message to transmission
identifier
    Clear hop count field of message
    Transmit as normal.
```

(A Multicast Transmission System would Mean that all Devices in Range, Including Other Repeaters, will Receive the Message)
Reception by a Device that is Operating as a Repeater:

```
IF message hop count is clear THEN
    Accept message and process it as normal
    Increment the hop count field of the message
    Add message signature to my history
    Queue the message for normal transmission
ELSE IF message signature is in my history THEN
    Discard message
ELSE
    Accept message and process it as normal
    IF the message hop count is within limits THEN
        Increment the hop count field of the message
        Add message signature to my history
        Queue the message for normal transmission
    END IF
END IF
```

(A Multicast Transmission System would Mean that all Devices in its Range, Including Other Repeaters, Will Receive the Message.)

In one embodiment, there is minimal modification of existing processing and layers in a non-mesh communication protocol stack. This is achieved by, in one form, allocating two new fields—the hop count and the transmission identifier. These fields are populated and managed by a new communication protocol sub-layer which is inserted between previously existing layers of a protocol stack.

With reference to the ISO Open Systems Interconnection (OSI) reference model for communication protocol stacks, the data link layer usually includes one or more Medium Access Control (MAC) sub-layers. In one form, the new communication sub-layer appears at the top of any existing MAC layers, as shown in FIG. 15. The new sub-layer is referred to as the MAC-MESH sub-layer. The MAC-MESH sub-layer applies the algorithms described in the pseudo-code above, and makes use of a history cache that is slightly smaller than the span of possible transmission identifiers.

These examples do not in any way limit the range of devices in which the invention can be applied, or the possible place of implementation in a communication protocol stack, or the history cache sizing and access methods.

FIG. 16 shows an exemplary architecture of a device 600 (for example device T1, RP1 and/or RP2 in FIG. 4) according to one aspect of the present invention. In particular, there is shown an antenna 606 connected to a transceiver 602, via an optional impedance matching circuit 601. The transceiver 602 is in turn connected to a microprocessor 603 for passing received and transmitted data information to software running in the microprocessor 603, as well as control data.

In a typical implementation, the antenna 606 will be custom designed to suit the device. The impedance matching circuit 601, if present, will be designed to suit the antenna 606 and transceiver 602 as will be understood by the person skilled in the art. The transceiver 602 could be either a discrete circuit, or an off-the-shelf transceiver IC. Such integrated circuits are available from many manufacturers including, but not limited to, Texas Instruments, Motorola, Chipcon, Nordic, RF Monolithics, and many others. Some transceivers include automatic impedance matching, and such a transceiver would remove the need to include impedance matching circuit 601.

The microprocessor 603 will be chosen to provide a suitable capacity to operate the communication protocol, the repeating and receiving functions, and any other functions desired of the device 600. Typical microprocessors are available from many manufacturers, including Atmel, Texas Instruments, Zilog, Freescale, ST, and many others.

When the selective mesh repeater function is used in conjunction with the communication protocols described in any one or more of PCT/AU2004/001052, PCT/AU2004/001053 and PCT/AU2004/001054, a small microprocessor with approximately 20K to 60K of program memory and 1K to 2K of operating variable (RAM) memory is suitable.

The operating frequency of the device 600 will be determined by local regulations, and choice of transceiver 602. For low power operation, frequencies in most parts of the world include 433.92 MHz, 868 MHz, 916 MHz and a band located at approximately 2400 MHz.

A memory 604 is also provided to store information such as software instructions and data, including the transmission identifiers referred to above. It will be appreciated that memory 604 is shown as a separate block to microprocessor 603, but could equally be part of microprocessor 603.

Possible devices having a hardware architecture that may be used to implement the various aspects of the present invention include the x585xA series and the x588xA series of wall switches sold by the present applicant, Clipsal Australia Pty Ltd.

According to another aspect of the present invention, further efficiencies may be gained by considering the practical memory size of the microprocessor. Practical microprocessors have finite memory, preventing use of an infinite sized transmission identifier, and similarly preventing an infinite history of transmission identifiers that have been observed in the past.

This aspect of the invention therefore provides a refinement to allow operation with the small amounts of memory available in many low cost microprocessors.

In one example, the transmitting devices use an m bit transmission identifier. Therefore the possible transmission identifiers will be in the range $0 \ldots 2^m-1$, and the transmission identifier range is $N=2^m$. Using binary arithmetic, once the transmission identifier reaches its maximum value ($2^m-1$) a further increment will cause the number to overflow and "roll over" back to 0.

In this example, the history will hold no more than N−1 previous transmission identifiers (or Transmission Signatures if appropriate), because anything larger could leave entries in the history when the transmission identifier rolls over. The roll-over is effectively re-using a transmission identifier, so by appropriate sizing of the history store, the identifier that is re-used will be removed from the history before the re-use occurs. If a re-used transmission identifier is left in the history, it may be possible for a receiver or repeater device to discard a message that should actually be accepted or repeated.

Performance of a Repeater device will be compromised by inefficient search of the history, inefficient expiry or removal of old items, and inefficient insertion of new items into the history.

According to another aspect of the present invention, a further simplification is possible by limiting the size of the history to N−1 entries or less. In this case, the history is unable to hold a complete span of transmission identifiers from a single transmitting device. This allows a significant simplification of the operation of the history store: old items never need to be removed, they are simply over-written with new items and the history store can operate as a circular buffer with only a single update pointer.

In one example, if the Transmission Identifier has 3 bits, then $N=8$ ($2^3$). In this example, the history store will ideally have more than 2 entries but not more than 7 entries. The history store therefore in this example can hold 2, 3, 4, 5, 6 or 7 entries. In another example where the Transmission identifier has 4 bits, N=16 and the history cache could hold 2, 3, 4, 5, 6, 7, 8, 9, 10, 11, 12, 13, 14 or 15 entries.

In this aspect, information is loaded into a history of incoming messages. The information stored in the history is a Transmission Signature. In the minimal implementation, the Transmission Signature is specifically made up of two pieces of information: a hop count and a transmitter identifier, implemented in a MAC_MESH sub-layer. Furthermore, as previously described, the size of the history cache is chosen to be slightly smaller that the span of possible transmission identifiers. The approach then assumes that each incoming message is compared to the history of previous Transmission Signatures, and those incoming messages whose signatures match will be discarded. Those incoming messages with a Signature that does not appear in the history will have their Signature added to the history.

Because the signature includes identifiers of finite size, in particular the transmission identifier, some fields can have a binary overflow where excess bits are discarded, effectively causing the value of that identifier to roll-over back to zero (0). In this case, provided the size of the history is smaller than the span of the transmission identifiers, the history automatically "ages" out old entries by simply adding new entries over the top of oldest entries. For example, if the transmission identifier uses 3 bits, then valid transmission identifiers are 0, 1, 2, 3, 4, 5, 6, 7. An increment after each transmission goes through this sequence and then starts again from 0. If the history has a size of 7 entries, then it is automatically the case that incoming entries from a single transmitter will occupy the history as (for example) so that it contains, when starting empty:

0, 1, 2, 3, 4, 5, 6

The $8^{th}$ message (with transmission identifier 7) will cause the history to contain transmission identifiers:

7, 1, 2, 3, 4, 5, 6

The $9^{th}$ message (with transmission identifier 0) will cause the history to contain transmission identifiers:

7, 0, 2, 3, 4, 5, 6 and so on.

It can be seen that prior to inserting the incoming transmission identifier into the history, that identifier was not present and so the identifier was correctly added.

This approach works well for perfect transmission. In the event of a lost message however, then an incoming message may have a transmission identifier (which is being re-used following the roll-over) which is present in the history when it should not be. This causes newly arriving messages to be discarded erroneously.

There are a number of solutions to this situation, as described below.

One solution is to use a larger span of transmission identifiers AND a considerably smaller history (for example, a span of transmission identifiers using about 5 bits for example, yielding transmission identifiers in the range 0 . . . 31), and using a history with a size approximately half the size of the span—in this case with about 16 entries.

Another solution is to prune the history when an incoming message arrives. This pruning removes excessive (and unneeded) entries for the transmitter of the incoming message only. This has the effect of allowing a large history, which is useful for recording the signatures of a large number of transmitting devices, and also handles the case of sequential lost messages from a single device. The number of lost messages that can be handled will correspond to the number of entries in the history that are pruned.

In one form, the pruning of the history for a single entry is slightly less than half the span of transmission identifiers, and can be implemented for a newly arrived message, as follows:

The operation "Add message signature to my history" is changed from a straightforward adding of the signature to the history:

Add Message Signature to My History:
Find the oldest entry in the history
Add the signature of the incoming message at this point
And instead this operation becomes:
Add Message Signature to My History:

---

Find the oldest entry in the history
Add the signature of the incoming message at this point
FOR each history entry LOOP
    IF incoming transmitter ID matches entry in history THEN
        IF incoming transmission number is more than "x" away from
            entry in the history THEN
            discard this history entry
        END IF
    END IF
END LOOP

---

Where in the above, "x" is the chosen number of entries to retain in the history for a given transmitter, and "x" would typically be about ½ the span of the transmission identifiers.

According to another aspect of the present invention, there is provided a machine-readable medium containing software instructions that cause a machine to perform one or more of the various methods described herein, and to cause a machine to operate and/or transmit signals in accordance with one or more of the various protocols described herein.

Although particular embodiments of the present invention has been described in the detailed description, it will be understood that the invention is not limited to the embodiments disclosed, but is capable of numerous rearrangements, modifications and substitutions without departing from the scope of the invention. Modifications and variations such as would be apparent to the person skilled in the art are deemed to fall within the scope of the present invention.

Throughout this specification and the claims that follow unless the context requires otherwise, the words "comprise" and "include" and variations such as "comprising" and "including" will be understood to imply the inclusion of a stated integer or group of integers but not the exclusion of any other integer or group of integers.

The reference to any prior art in this specification is not, and should not be taken as, an acknowledgment or any form of suggestion that such prior art forms part of the common general knowledge.

The invention claimed is:

1. A method of processing a Transmission within a wireless network, the network including at least one device that transmits the Transmission and at least one device that at least receives the Transmission, the method comprising:
receiving the Transmission at the device that at least receives the Transmission;
determining a Transmission Signature for the Transmission based upon the product of an Originating Transmitter Identifier, identifying an Originating Transmitter, and a unique Message Transmission Identifier included in the received Transmission, wherein the Message Transmission Identifier is m bits in length;
comparing the determined Transmission Signature with one or more stored Transmission Signatures of previous Transmissions stored in a memory of the device that at least receives the Transmission to determine whether the device that at least receives the Transmission has previously received the Transmission, wherein the memory for storing the Transmission Signatures has up to $2^m-1$ entries for storing the Transmission Signatures; and
actioning the received Transmission and storing the Transmission Signature in the memory of the device that at least receives the Transmission only if the device that at least receives the transmission has not previously received the Transmission.

2. The method as claimed in claim 1 wherein the device that at least receives the Transmission is a Receiver, and the step of actioning the Transmission is accepting the Transmission.

3. The method as claimed in claim 1 wherein the device that at least receives the Transmission is a Repeater, and the step of actioning the Transmission is repeating the Transmission.

4. The method as claimed in claim 1 wherein the Message Transmission Identifier is provided to the Transmission by the Originating Transmitter generating and transmitting the Transmission.

5. The method as claimed in claim 1 further comprising actioning the Transmission if a hop count of the Transmission is equal to zero.

6. The method as claimed in claim 5 further comprising comparing the hop count of the Transmission with a hop count threshold and not actioning the Transmission if the hop count is more than the hop count threshold.

7. The method as claimed in claim 1 wherein the wireless network is a multicast wireless network.

8. The method as claimed in claim 1, further comprising:
finding the oldest Transmission Signature entry in the memory; and
replacing the oldest Transmission Signature entry in the memory with the determined Transmission Signature.

9. The method as claimed in claim 1, further comprising pruning the Transmission Signature entries stored in the memory after receipt of a transmission that has not previously been received.

10. The method as claimed in claim 9, wherein an entry in the memory is pruned if the Originating Transmitter Identifier of the received Transmission matches the Transmitter Identifier of the entry and if the Message Transmission Identifier of received Transmission is more than a predetermined number of entries away from the Message Transmission Identifier of the entry in the memory.

11. The method as claimed in claim 1, wherein the Transmission comprises a frame structure, the frame structure comprising:
- a data field;
- a transmitter identifier field; and
- a message transmission identifier field.

12. The method as claimed in claim 11, wherein the frame structure further comprises a hop count field.

13. A device for use in a wireless communications network, the device comprising:
- a receiver for receiving a Transmission; and
- a microprocessor;
a memory for storing one or more Transmission Signatures and comprising instructions to cause the microprocessor to:
- determine a Transmission Signature for the Transmission based upon the product of an Originating Transmitter Identifier, identifying an Originating Transmitter, and a unique Message Transmission Identifier included in the Transmission, wherein the Message Transmission Identifier is m bits in length;
- compare the Transmission Signature of the Transmission with the one or more stored Transmission Signatures to determine whether the Transmission has been previously received;
- action the Transmission only if the Transmission has not been previously received; and
- store the Transmission Signature in the memory, wherein the memory stores up to $2^m-1$ entries for storing the Transmission Signatures.

14. The device as claimed in claim 13 wherein the device is a Repeater.

15. The device as claimed in claim 14 wherein the step of actioning the Transmission is accepting the Transmission.

16. The device as claimed in claim 13 wherein the device is a Receiver.

17. The device as claimed in claim 16 wherein the step of actioning the Transmission is repeating the Transmission.

18. The device as claimed in claim 13 wherein the wireless network is a multicast wireless network.

19. The device as claimed in claim 13, wherein the memory stores up to $2^{m-1}$ entries for storing the Transmission Signatures.

20. The device as claimed in claim 13, wherein storing the Transmission Signature in the memory comprises:
- finding the oldest entry in the memory; and
- replacing the oldest entry in the memory with the Transmission Signature.

21. The device as claimed in claim 13, further comprising pruning the Transmission Signature entries stored in the memory after receipt of a transmission that has not previously been received.

22. The device as claimed in claim 13, wherein an entry in the memory is pruned if the Originating Transmitter Identifier of the received Transmission matches the Transmitter Identifier of the entry and if the Message Transmission Identifier of received Transmission is more than a predetermined number of entries away from the Message Transmission Identifier of the entry in the memory.

23. The device as claimed in claim 22 wherein the memory further comprises instructions for comparing the hop count of the Transmission with a hop count threshold and not actioning the Transmission if the hop count is more than the hop count threshold.

24. The device as claimed in claim 13 wherein the memory further comprises instruction for actioning the Transmission if a hop count of the Transmission is equal to zero.

25. The method as claimed in claim 13 wherein the memory for storing the Transmission Signatures has up to $2^{m-1}$ entries for storing the Transmission Signatures.

26. A non-transitory computer readable medium, comprising instructions for causing a machine to perform a method of processing a Transmission within a wireless network, the network including at least one device that transmits the Transmission and at least one device that at least receives the Transmission, the method comprising
- receiving the Transmission at the device that at least receives the Transmission;
- determining a Transmission Signature for the Transmission based upon the product of an Originating Transmitter Identifier, identifying an Originating Transmitter, and a unique Message Transmission Identifier included in the received Transmission, wherein the Message Transmission Identifier is m bits in length;
- comparing the determined Transmission Signature with one or more stored Transmission Signatures of previous Transmissions stored in a memory of the device that at least receives the Transmission to determine whether the device that at least receives the Transmission has previously received the Transmission, wherein the memory has up to $2^m-1$ entries for storing the Transmission Signatures; and
- actioning the received Transmission and storing the Transmission Signature in the memory of the device that at least receives the Transmission only if the device that at least receives the transmission has not previously received the Transmission.

27. The non-transitory computer readable medium as claimed in claim 26, wherein the device that at least receives the Transmission is a Receiver, and the step of actioning the Transmission is accepting the Transmission.

28. The non-transitory computer readable medium as claimed in claim 26, wherein the device that at least receives the Transmission is a Repeater, and the step of actioning the Transmission is repeating the Transmission.

29. The non-transitory computer readable medium as claimed in claim 26, wherein the Message Transmission Identifier is provided to the Transmission by the Originating Transmitter generating and transmitting the Transmission.

30. The non-transitory computer readable medium as claimed in claim 26 wherein the memory for storing the Transmission Signatures has up to $N=2^{m-1}$ entries for storing the Transmission Signatures.

31. The non-transitory computer readable medium as claimed in claim 26, further comprising:
- finding the oldest Transmission Signature entry in the memory; and
- replacing the oldest Transmission Signature entry in the memory with the determined Transmission Signature.

32. The non-transitory computer readable medium as claimed in claim 26, further comprising pruning the Transmission Signature entries stored in the memory after receipt of a transmission that has not previously been received.

33. The non-transitory computer readable medium as claimed in claim 32, wherein an entry in the memory is pruned if the Originating Transmitter Identifier of the received Transmission matches the Transmitter Identifier of the entry and if the Message Transmission Identifier of received Transmission is more than a predetermined number of entries away from the Message Transmission Identifier of the entry in the memory.

34. The non-transitory computer readable medium as claimed in claim 26 further comprising actioning the Transmission if a hop count of the Transmission is equal to zero.

35. The non-transitory computer readable medium as claimed in claim 26 further comprising comparing the hop count of the Transmission with a hop count threshold and not actioning the Transmission if the hop count is more than the hop count threshold.

36. The non-transitory computer readable medium as claimed in claim 26, wherein the Transmission comprises a frame structure, the frame structure comprising:
a data field;
a transmitter identifier field; and
a message transmission identifier field.

37. The non-transitory computer readable medium as claimed in claim 36, wherein the frame structure further comprises a hop count field.

38. The non-transitory computer readable medium as claimed in claim 37 wherein the hop count is cleared by an originating transmitter.

39. The non-transitory computer readable medium as claimed in claim 36 wherein the message transmission identifier uniquely identifies each transmission originating from that transmitter.

40. The non-transitory computer readable medium as claimed in claim 36 wherein the message transmission identifier is limited to m bits in length.

41. The non-transitory computer readable medium as claimed in claim 36 wherein the message transmission identifier is incremented with each transmission, up to a maximum of $2^m-1$, after which a further increment sets the message transmission identifier to 0.

\* \* \* \* \*